US006626561B2

(12) United States Patent
Carter et al.

(10) Patent No.: US 6,626,561 B2
(45) Date of Patent: Sep. 30, 2003

(54) LAMP STRUCTURE, HAVING ELLIPTICAL REFLECTORS, FOR UNIFORMLY IRRADIATING SURFACES OF OPTICAL FIBER AND METHOD OF USE THEREOF

(75) Inventors: R. Sykes Carter, Murrels, SC (US); Robert L. Rhoades, Ijamsville, MD (US); Charles H. Wood, Rockville, MD (US)

(73) Assignee: Fusion UV Systems, Inc., Gaithersburg, MD (US)

( * ) Notice: Subject to any disclaimer, the term of this patent is extended or adjusted under 35 U.S.C. 154(b) by 0 days.

(21) Appl. No.: 09/885,004

(22) Filed: Jun. 21, 2001

(65) Prior Publication Data

US 2002/0012252 A1 Jan. 31, 2002

Related U.S. Application Data

(60) Provisional application No. 60/213,295, filed on Jun. 22, 2000.

(51) Int. Cl.[7] .................................................. F21V 7/08
(52) U.S. Cl. ....................... 362/298; 362/346; 362/350; 250/504 R; 250/455.11
(58) Field of Search ................................ 362/297, 298, 362/346, 350; 250/492.1, 504 R, 455.11

(56) References Cited

U.S. PATENT DOCUMENTS

| 3,763,348 | | 10/1973 | Costello | |
|---|---|---|---|---|
| 4,591,724 | * | 5/1986 | Fuse et al. | 250/454.11 |
| 4,710,638 | * | 12/1987 | Wood | 250/492.1 |
| 4,913,859 | | 4/1990 | Overton et al. | |
| 5,247,178 | * | 9/1993 | Ury et al. | 210/748 |
| 5,298,759 | * | 3/1994 | Brewer et al. | 118/722 |
| 5,918,974 | | 7/1999 | Suzuki et al. | |

FOREIGN PATENT DOCUMENTS

| EP | 0 660 148 | 6/1995 |
|---|---|---|
| JP | 5-254894 | 1/1994 |
| WO | WO 94/23243 | 10/1994 |

OTHER PUBLICATIONS

International Search Report dated Dec. 12, 2002, for PCT/US01/20037.

G. Loos, et al., "Optimierungsmethoden für optische Reflektorsysteme", Optik, vol. 80, No. 1 (Aug. 1, 1988), pp. 33–38.

* cited by examiner

*Primary Examiner*—Sandra O'Shea
*Assistant Examiner*—Hargobind S. Sawhney
(74) *Attorney, Agent, or Firm*—Antonelli, Terry, Stout & Kraus, LLP

(57) ABSTRACT

A lamp for more uniformly irradiating surfaces of fibers (including ribbon-shaped fibers), such as optical fibers, and methods of using such lamp, are provided. The lamp has primary and secondary elliptical-shaped reflectors, forming an elliptical space therebetween with the fibers in the vicinity of one focal point of the elliptical space, on the major axis of the elliptical space. The lamp bulb is centered on this major axis of the elliptical space, in the vicinity of the other focal point to provide a dispersed ray pattern at the fiber for more uniformity over the surfaces of the fibers. Ends of the primary reflector can be provided with end reflectors which can have mounts for the lamp bulb. The lamp can be used to cure a light curable coating (e.g., ink, polymer) on the fiber.

52 Claims, 9 Drawing Sheets

LAMP STRUCTURE, HAVING ELLIPTICAL REFLECTORS, FOR UNIFORMLY IRRADIATING SURFACES OF OPTICAL FIBER AND METHOD OF USE THEREOF

Priority is claimed under 35 USC 119(e) based on provisional application Ser. No. 60/213,295, filed Jun. 22, 2000.

BACKGROUND

The present invention is directed to lamp structure having elliptical reflectors, and methods of use thereof, for more uniformly irradiating surfaces of at least one workpiece (for example, a continuous workpiece such as a continuous fiber and/or filament). The present invention is particularly directed to apparatus, and methods, for more uniformly irradiating optical fibers, cables and ribbons, which continuously pass by a bulb, of the lamp, generating the radiation, within an elliptical space formed by the reflectors.

The present invention is especially useful in connection with irradiating a workpiece passing along a lamp bulb producing, for example, infrared light, visible light or ultraviolet light, in the processing of workpieces to cure a photo-responsive coating (for example, ultraviolet light curable coatings, and coloring inks) on surfaces of the workpieces.

The present invention has uses within the optical fiber market, including methods for processing fibers, ribbons and cables of various widths and thickness cross-sections, multi-fiber coloring, strengthening members and other applications that require a pattern of radiant flux density to the workpieces being processed.

Conventional apparatus (systems) for irradiating a fiber or ribbon with ultraviolet light includes a lamp (for example, a modular lamp, such as a microwave-powered lamp having a microwave-powered bulb (e.g., tubular bulb) with no electrodes or glass-to-metal seals), the lamp having reflectors. The reflectors can desirably utilize a primary elliptical-shaped reflector and also a secondary elliptical-shaped reflector (which optionally can have a cylindrical back reflector). This reflector structure of primary and secondary elliptical-shaped reflectors is illustrated in FIG. 1, which shows the structure of "DRF Systems" (ultraviolet curing systems for optical fiber, coloring, ribbon and cable) of Fusion UV Systems, Inc.

Thus, shown in FIG. 1 is bulb 1 (e.g., a tubular bulb), centered at first focal point 2. Hereinafter, when it is stated herein that the bulb is positioned at a location, it is meant that the bulb is centered at such location. This first focal point 2 is one of the two focal points in elliptical space 4 surrounded by primary elliptical-shaped reflector 3 and secondary elliptical-shaped reflector 9. The second focal point of this elliptical space 4 is designated by reference character 6, at which point optical fiber 5 is centered. Also shown in FIG. 1 is quartz tube 7, through which optical fiber 5 passes. Quartz tube 7 is preferred in order to be able to provide a desired atmosphere (for example, an inert gas atmosphere) surrounding optical fiber 5, without the need for filling the entire elliptical space 4 with such inert gas. Also shown in FIG. 1 is cylindrical back (auxiliary) reflector 11.

As seen in FIG. 1, light 12 from bulb 1, either directly or more likely after being reflected by reflectors 3, 9 and/or 11, is transmitted through quartz tube 7 to be irradiated on, e.g., optical fiber 5 to perform a process thereon (for example, cure a coating on the optical fiber).

In the structure shown in FIG. 1, bulb 1 is positioned at first focal point 2 of elliptical space 4 formed by primary elliptical-shaped reflector 3 and secondary elliptical-shaped reflector 9, and the workpiece runs through second focal point 6 of elliptical space 4.

FIG. 2 shows a standard ray diagram for conventional "DRF Systems" of Fusion UV Systems, Inc., having primary and secondary elliptical-shaped reflectors 3 and 9, but without a cylindrical back reflector 11. Bulb 1 is positioned at first focal point 2 of the elliptical space 4 of the reflector, that is, a position 1.900 inches from a midpoint of the major axis of the elliptical space 4.

That is, FIG. 2 shows the standard I25X/I60X ray diagram for the apparatus having primary and second elliptical-shaped reflectors 3 and 9, respectively with a distance of 4.271 inches between bulb 1 and fiber 5 and an entire distance between the ends of the primary and secondary elliptical-shaped reflectors being 6.000 inches. A maximum width of the reflectors is 4.214 inches. As shown in this standard ray diagram of FIG. 2, bulb 1 and fiber 5 are respectively at the primary and secondary focal points 2, 6 of elliptical space 4; light 12 from bulb 1 is substantially transmitted to fiber 5 passing through second focal point 2 of the elliptical space 4.

However, various problems arise in connection with use of this conventional structure. For one thing, alignment of the fiber 5 at secondary focal point 6 is critical, but can be difficult to achieve.

In addition, focusing of light rays 12 at second focal point 6 can cause problems in uniformity when, for example, the fiber or fibers being treated are not solely at second focal point 6. For example, where a ribbon is being processed which has a planar surface having a width perpendicular to the direction of motion of the ribbon (that is, in a width direction of elliptical space 4 shown in FIG. 1), focusing of light rays 12 at second focal point 6 causes non-uniformity of light irradiating on the ribbon. Such non-uniformity is especially disadvantageously great for light irradiating the surface of the ribbon facing bulb a compared with light irradiating the surface of the ribbon facing away from bulb 1.

In order to avoid the aforementioned problems of conventional structure, a proposed technique would be to position the workpiece slightly away from the second focal point 6, so that a pattern of radiation spaced from second focal point 6 impinges on the workpiece. This is shown in FIG. 3, where ribbon 15 is displaced slightly from second focal point 6, in a direction along major axis 22 of elliptical space 4, toward secondary elliptical-shaped reflector 9. However, this technique of moving the workpiece does not in and of itself provide sufficient uniformity of radiation pattern on surfaces of ribbon 15.

Accordingly, it is desired to provide apparatus and methods of use of such apparatus, providing a more uniform irradiation of all surfaces of the workpiece, including workpiece surfaces facing the bulb and surfaces facing away from the bulb, using elliptical-shaped reflector structure. It is desired to provide such more uniform irradiation of surfaces of the workpiece, without the need for providing precise positioning of the workpiece at the second focal point, and wherein the apparatus can be utilized to process, e.g., fibers, ribbons and cables of various widths and thickness cross-sections.

SUMMARY

The present invention overcomes deficiencies of the above-described techniques, achieving a more uniform dispersion of light over the surfaces of the workpieces, by moving the bulb such that the bulb is spaced from the first focal point. That is, while, according to conventional techniques, the center of the bulb is at the first focal point, according to the present invention the center of the bulb is spaced from the first focal point of the ellipse. According to the present invention, the bulb is positioned spaced from the first focal point of the ellipse in the vicinity thereof, on the major axis of the ellipse.

Thus, according to one aspect of the present invention, structure of a lamp for irradiating at least one workpiece, this structure including reflector structure, is provided. The reflector includes primary and secondary elliptical-shaped reflectors, these two reflectors in combination forming substantially an ellipse, surrounding an elliptical space, with the ellipse having a major axis and first and second focal points, the first focal point being closer to the primary reflector than the second focal point is to this primary reflector, along the major axis. This structure of the lamp includes support structure for a bulb of this lamp, to support the bulb within the elliptical space, so that the bulb is spaced from the first focal point of the ellipse in the vicinity thereof, on the major axis of the ellipse.

As a further aspect of this invention, a lamp is provided including the bulb, spaced from this first focal point of the ellipse.

According to the present invention, the bulb can be displaced from the first focal point, along the major axis, either in a direction toward the primary elliptical-shaped reflector or in a direction away from the primary elliptical-shaped reflector (that is, in a direction toward the secondary elliptical-shaped reflector). The bulb is to be maintained in the vicinity of the first focal point, in order to achieve objectives according to the present invention.

As another aspect of the present invention, the structure, including the reflector structure, also includes end reflectors covering both ends of the primary elliptical-shaped reflector, but, for example, not extending beyond the ends of this primary reflector. The end reflectors can be provided with a support (for example, holes) for supporting the bulb of the lamp.

According to further aspects of the present invention, each of the primary and secondary elliptical-shaped reflectors extends in a longitudinal direction and is positioned so as to form, in combination, a cylinder having an axis extending in the longitudinal direction. The bulb can be a tubular bulb having an axis extending in this longitudinal direction, and the workpiece or workpieces can be passed in this longitudinal direction along the bulb, during processing.

According to other aspects of the present invention, the workpieces treated are processed while in the vicinity of the second focal point, on the aforementioned major axis. That is, the workpiece or workpieces being treated can be at the second focal point (that is, centered at the second focal point) or displaced therefrom, along the major axis, either in a direction toward the primary elliptical-shaped reflector or secondary elliptical-shaped reflector while still in a vicinity of the second focal point.

In the foregoing, it has been described that the bulb and the at least one workpiece being processed respectively are in the vicinity of the first focal point of the ellipse, along the major axis thereof, but not at the first focal point; and in the vicinity of the second focal point of the ellipse, along the major axis thereof. By "in the vicinity of the first focal point, but not at the first focal point", means that the bulb is closer to the first focal point than to the second focal point, but is not at the first focal point so as to achieve dispersion of rays arriving in the vicinity of the second focal point, providing more uniformity according to the present invention. The positioning of the workpieces in the vicinity of the second focal point means that the workpieces can be centered on a major axis closer to the second focal point than to the first focal point, and sufficiently distanced from the bulb to achieve substantial uniformity. The workpieces can be centered at the second focal point; thus, workpieces in the vicinity of the second focal point includes the workpieces being centered at the second focal point.

According to the present invention, the light provided by the bulb can be any of various types, including at least one of ultraviolet light, infrared light and visible light. Various different types of bulbs can be utilized. For example, a bulb of an arc lamp can be utilized, for providing ultraviolet light. As an alternative, the bulb can be a microwave-powered, ultraviolet light-generating electrodeless bulb; that is, microwaves can be applied to such bulb to generate ultraviolet light which is reflected by the elliptical-shaped reflectors and irradiates the workpieces.

The present invention, as another aspect thereof, also includes apparatus for irradiating surfaces of the periphery of at least one workpiece, including the aforementioned elliptical-shaped reflectors and the bulb positioned on the major axis of the elliptical space formed by the reflectors, spaced from the first focal point of this elliptical space and in the vicinity of this first focal point. This apparatus includes structure for passing the at least one workpiece through the space surrounded by the primary and secondary elliptical-shaped reflectors, passing the at least one workpiece, e.g., in the vicinity of the second focal point of the elliptical space at a location centered on the major axis. According to additional aspects of the present invention, the at least one workpiece treated can be a continuous member, such as a continuous fiber, ribbon or cable. According to a specific apparatus, the workpieces processed can be optical fibers.

Additional aspects of the present invention include methods of using this apparatus, for substantially uniformly irradiating surfaces of at least one workpiece passing through the elliptical space in the vicinity of the second focal point, utilizing energy radiated from a bulb which is positioned on the major axis of the elliptical space formed by primary and secondary elliptical-shaped reflectors, in the vicinity of the first focal point of this elliptical space yet spaced from this first focal point. According to this process, as the at least one workpiece is passed through the space surrounded by the primary and secondary reflectors, in the vicinity of the second focal point, light is radiated from the bulb, the light reflecting off the reflectors to irradiate surfaces of the periphery of the at least one workpiece.

According to a specific use of this apparatus, as an aspect of the present invention, the apparatus can be used to cure an ultraviolet light curable coating on at least one workpiece. That is, the at least one workpiece, having the ultraviolet curable coating thereon, is passed through the space surrounded by the primary and secondary elliptical-shaped reflectors, in the vicinity of the second focal point of this elliptical space; and while performing such passing, ultraviolet light radiated from a bulb positioned on the major axis in the vicinity of the first focal point of this elliptical space, yet spaced from this first focal point, and reflecting off the primary and secondary reflectors, irradiates surfaces of the periphery of the at least one workpiece to cure the ultraviolet light curable coating.

Accordingly, by the various aspects of the present invention, uniformity of irradiation (for example, uniformity of intensity of the radiation) on all surfaces of the workpieces (both surfaces facing the bulb and surfaces facing away from the bulb) is improved, even for treatment of ribbons having, for example, substantially planar surfaces that are wide. In addition, a need for precision in placement of the workpieces, at the focal point, can be avoided.

DETAILED DESCRIPTION

While the invention will be described in connection with specific and preferred embodiments, it will be understood that it is not intended to limit the invention to those embodiments. To the contrary, it is intended to cover all alterations, modifications and equivalents as may be included within the spirit and scope of the invention as defined by the appended claims.

Throughout the present specification, where materials, methods and apparatus are described as including or comprising specific components or structure or specific processing steps, it is contemplated by the inventors that materials, methods and apparatus of the present invention also consist essentially of, or consist of, the recited components or structure or recited processing steps.

The present invention contemplates, as one aspect thereof, lamp structure including primary and secondary elliptical-shaped reflectors providing an elliptical space in which workpieces are irradiated with light generated from a bulb within the space, wherein the bulb is spaced, along the major axis of the elliptical space, from the first focal point but is positioned in the vicinity thereof (the workpieces being positioned in the vicinity of the second focal point), the bulb being centered along the major axis of the elliptical space. By displacing the bulb from the first focal point, uniformity of the radiation pattern is provided over a larger area (there is a larger distribution pattern), thereby providing more uniformity over surfaces of the workpieces. In addition, by displacement of the bulb as provided in the present invention, there is increased uniformity of irradiation of both the near and far surfaces of the workpieces (relative to the bulb). Thus, according to various aspects of the present invention, energy radiating from the bulb is dispersed more uniformly in the neighborhood of the workpieces.

Figure 1:
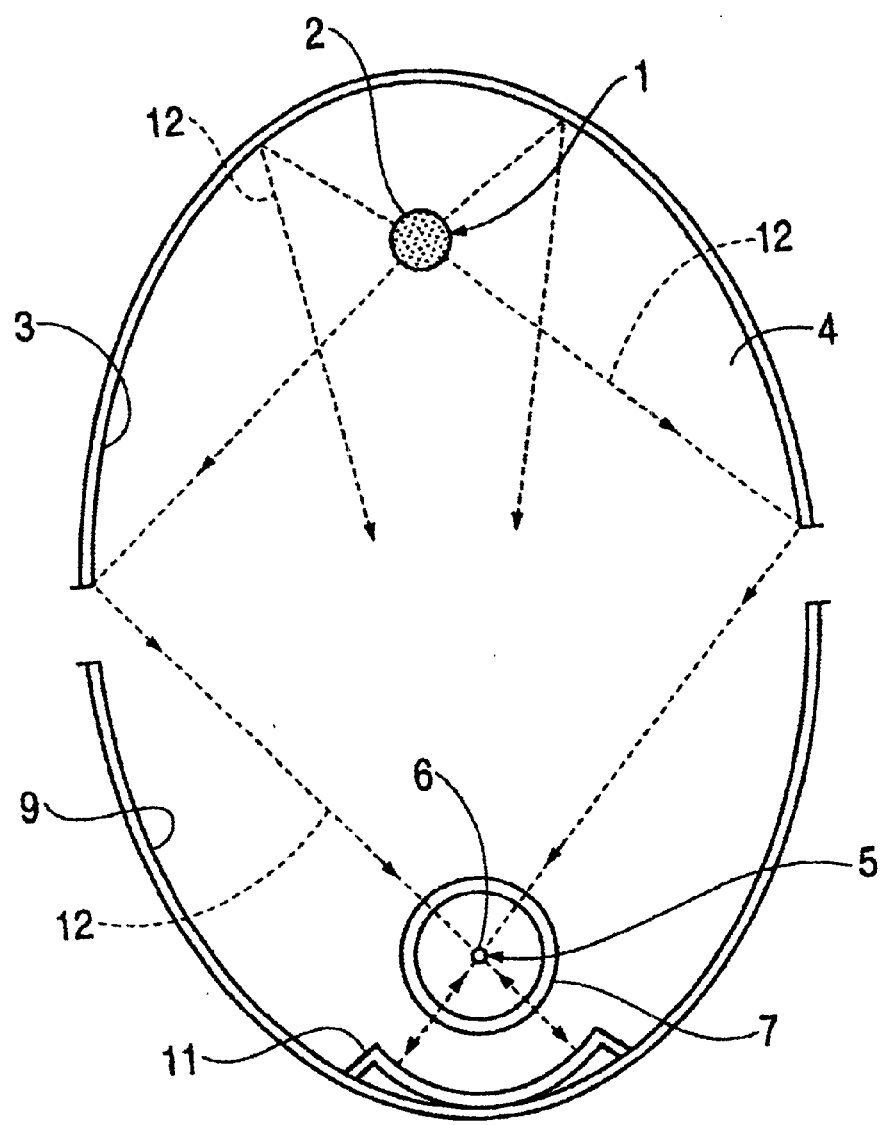
FIG. 1 is a cross-sectional view of a lamp according to the prior art technique.
Figure 2:
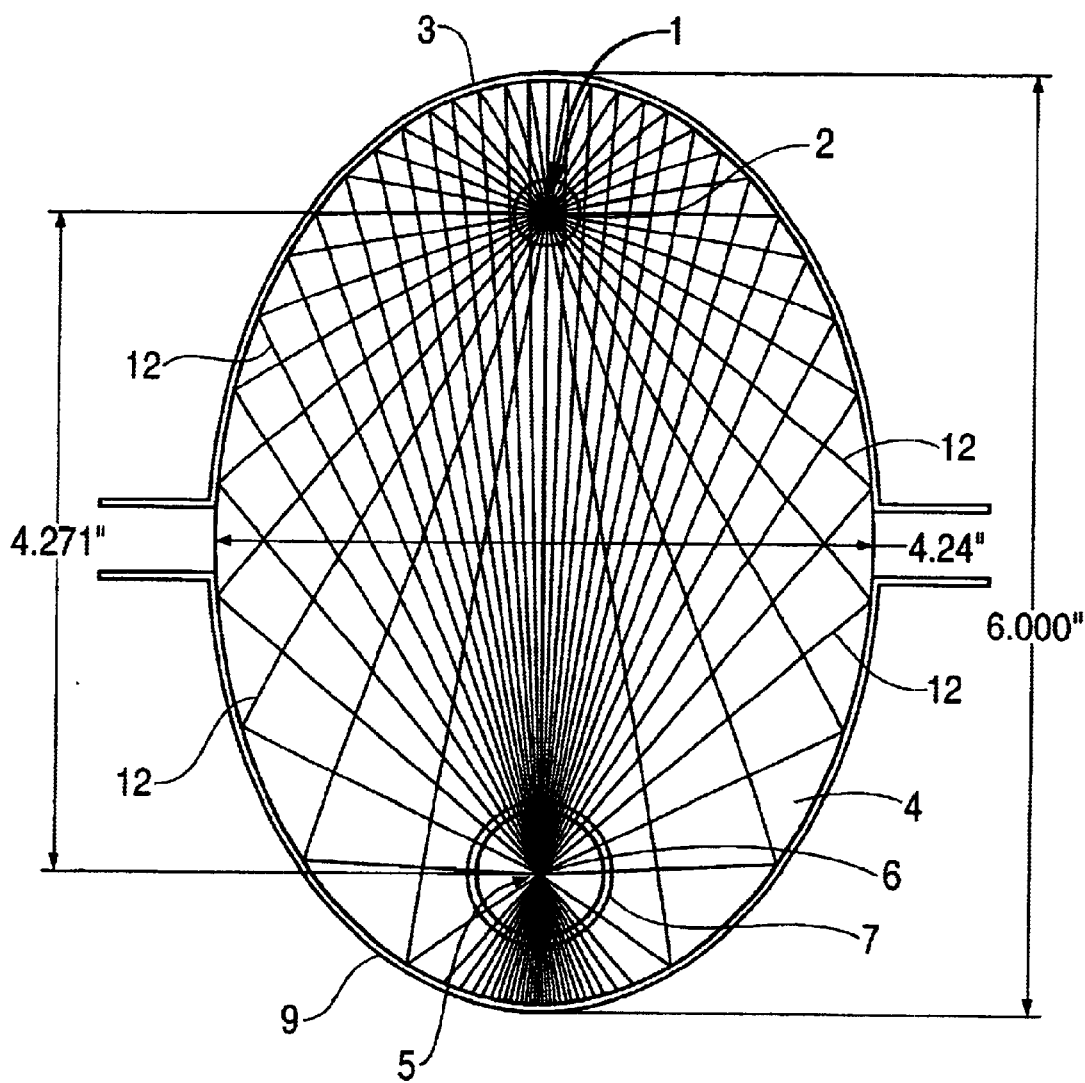
FIG. 2 shows a ray diagram for a lamp having primary and secondary elliptical-shaped reflectors shown in FIG. 1.
Figure 3:
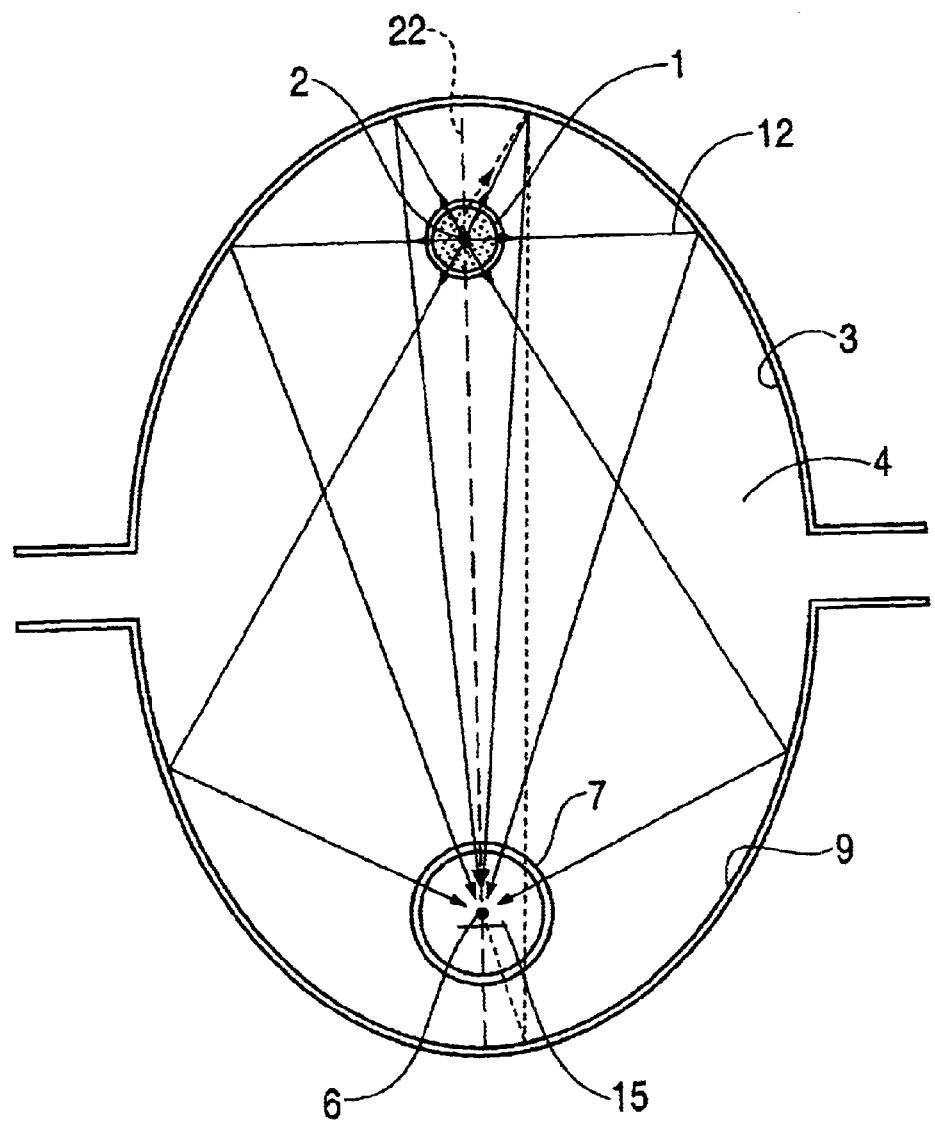
FIG. 3 is a cross-sectional view of a lamp showing a proposed change from the prior art technique, for furthering the understanding of the present invention.
Figure 4:
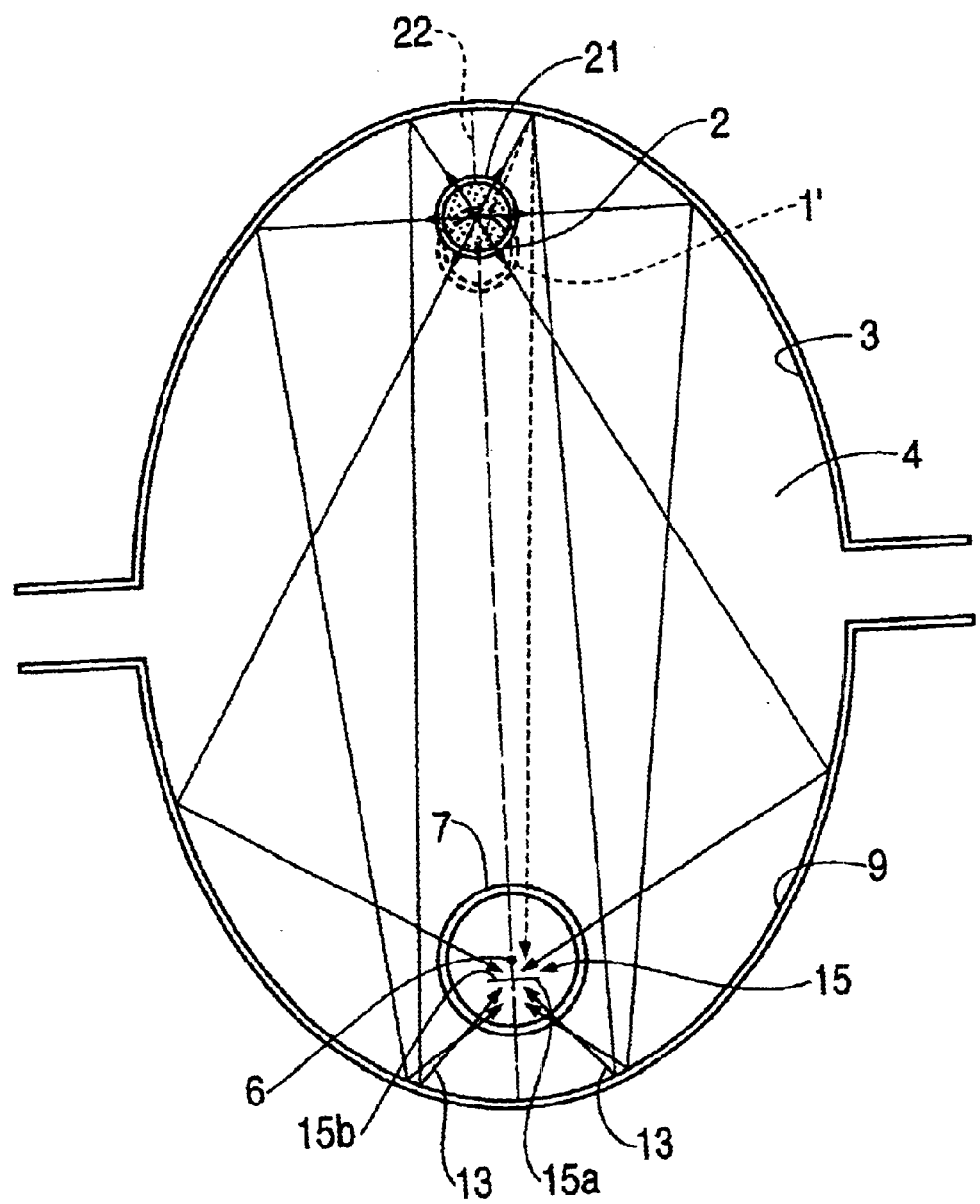
FIG. 4 is a cross-sectional view of a lamp according to a first embodiment of the present invention.

FIG. 4 is a cross-sectional view showing an embodiment of the present invention. According to this embodiment, primary and secondary elliptical-shaped reflectors 3, 9, respectively, enclose elliptical space 4. The center of bulb 21 has been moved so as to be spaced from first focal point 2, in a direction along major axis 22, toward primary elliptical-shaped reflector 3. While FIG. 4 shows bulb 21 displaced toward primary elliptical-shaped reflector 3, bulb 21 can be displaced toward secondary elliptical-shaped reflector 9 while remaining in the vicinity of first focal point 2. Also shown in FIG. 4 is the position of the bulb in prior structures (this position being indicated by reference character 1').

Also shown in FIG. 4 is ribbon 15, which irradiated by light from bulb 21. As can be appreciated from FIG. 4, ribbon 15 is displaced from second focal point 6, in a direction along major axis 22 toward secondary elliptical-shaped reflector 9. As seen in FIG. 4, flat surfaces 15a, 15b of ribbon 15 are perpendicular to major axis 22.

Shown in FIG. 4 is quartz tube 7, through which ribbon 15 passes. As seen in FIG. 4, ribbon 15 is displaced from the center of quartz tube 7; that is, quartz tube 7 has been maintained centered on second focal point 6. However, quartz tube 7, according to the present invention, can be moved such that the workpiece or workpieces is centered in the quartz tube.

Also shown in FIG. 4 are normal rays of light radiating from displaced bulb 21. As can be appreciated, various of the rays from bulb 21 are reflected twice off the primary and secondary reflectors, shown by reference character 13 in FIG. 4, prior to irradiating ribbon 15. These twice reflected rays achieve desired dispersion so as to achieve advantages according to the present invention of more uniform irradiation.

Figure 5:
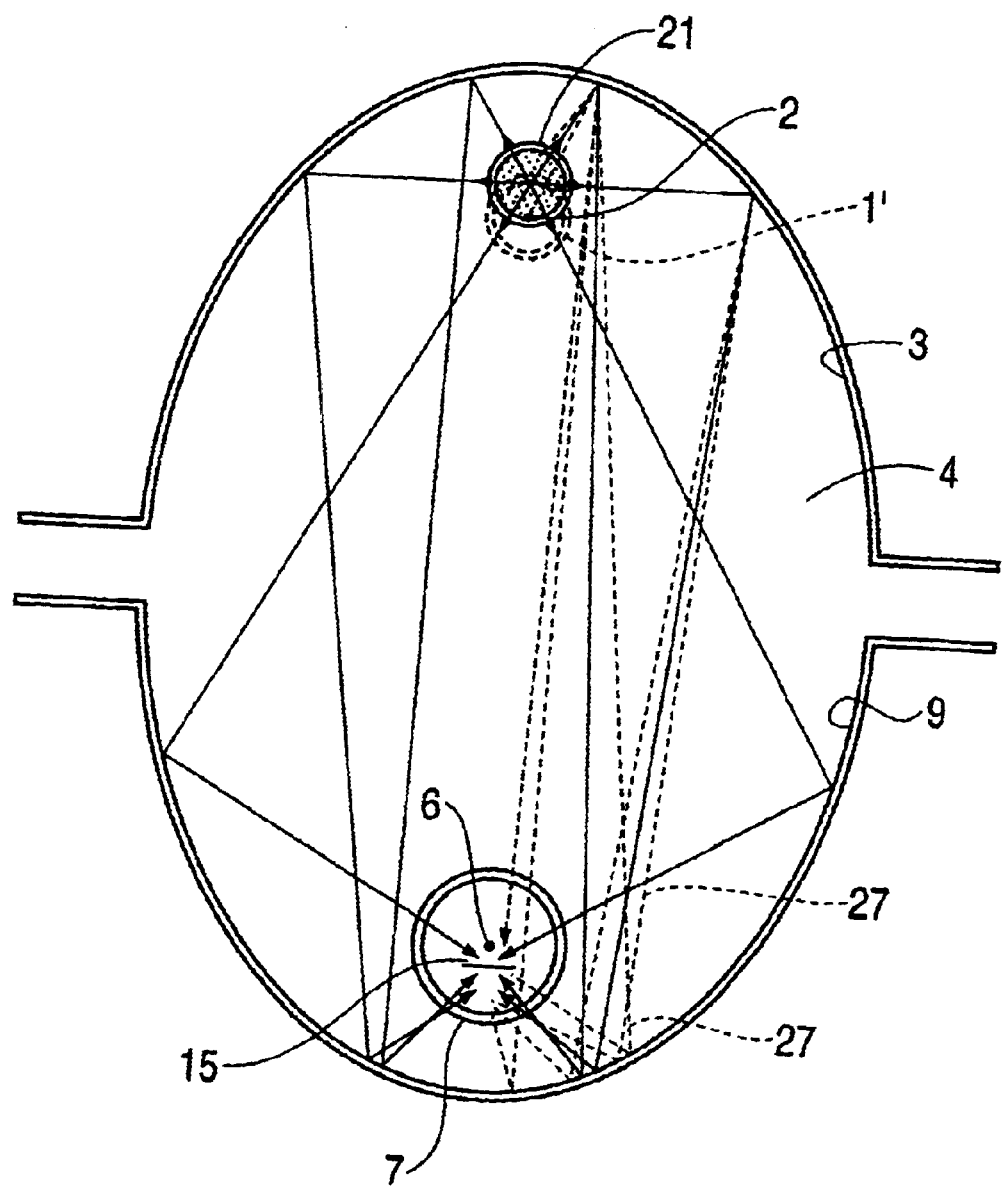
FIG. 5 is a cross-sectional view of a lamp according to the first embodiment, showing normal rays and divergent rays in accordance with the present invention.

FIG. 5 also shows the first embodiment according to the present invention, having six (6) normal rays. FIG. 5 also shows, in dotted line, divergent rays 27, arising due to the positioning of the bulb centered off of the first focal point. These divergent rays 27 (five divergent rays being shown in FIG. 5) further increases uniformity of distribution of light intensity over both front and rear surfaces of ribbon 15.

Figure 6:
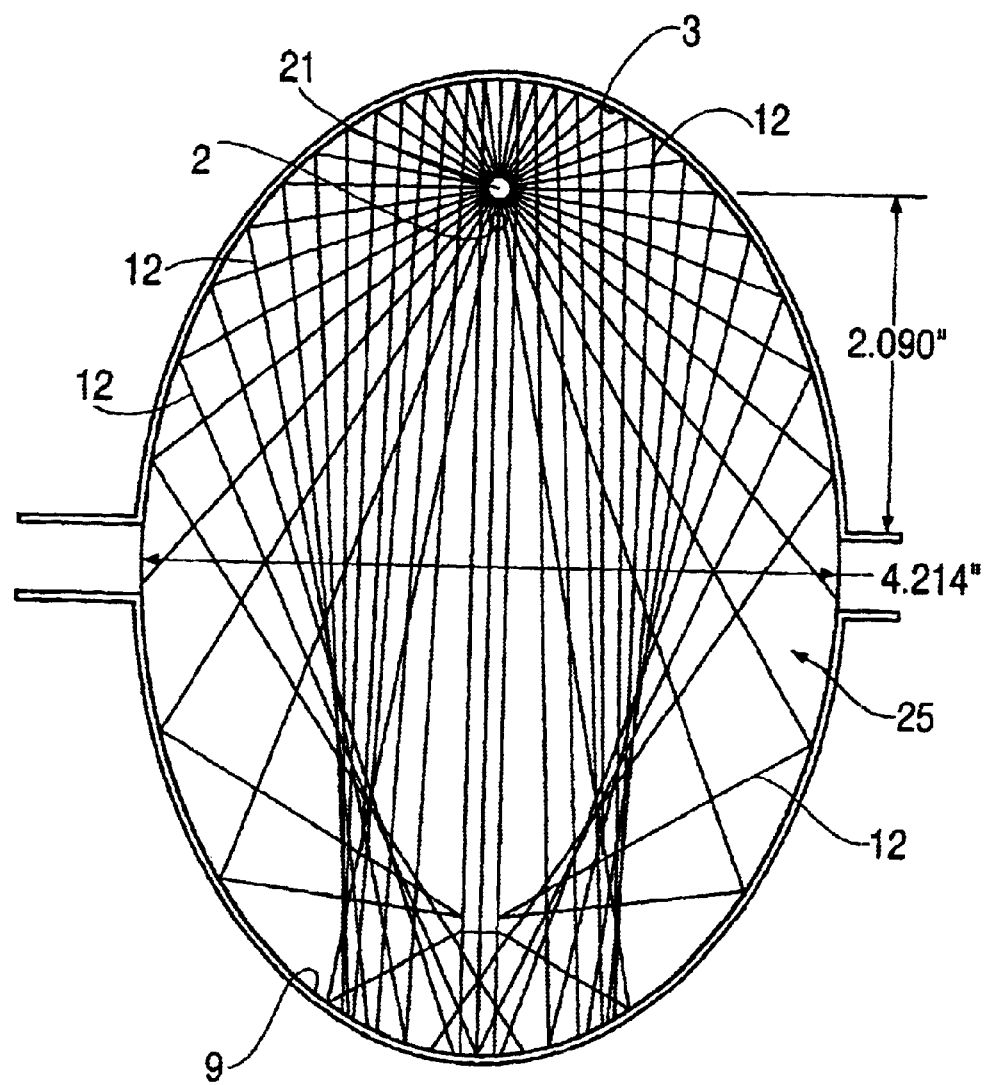
FIG. 6 shows the ray diagram according to the first embodiment of the present invention.

FIG. 6 shows ray diagram 25 of a lamp according to the present invention, when using an end reflector and bulb 21 displaced from the first focal point 2 according to the present invention. As seen in ray diagram 25, achieved when utilizing both primary and secondary elliptical reflectors 3 and 9, and end reflectors at both ends of the primary end reflector, a relatively dispersed energy distribution is achieved according to the present invention, avoiding concentration of light energy at, for example, the second focal point and thereby achieving improved distribution of energy irradiating surfaces of the workpieces.

Figure 7:
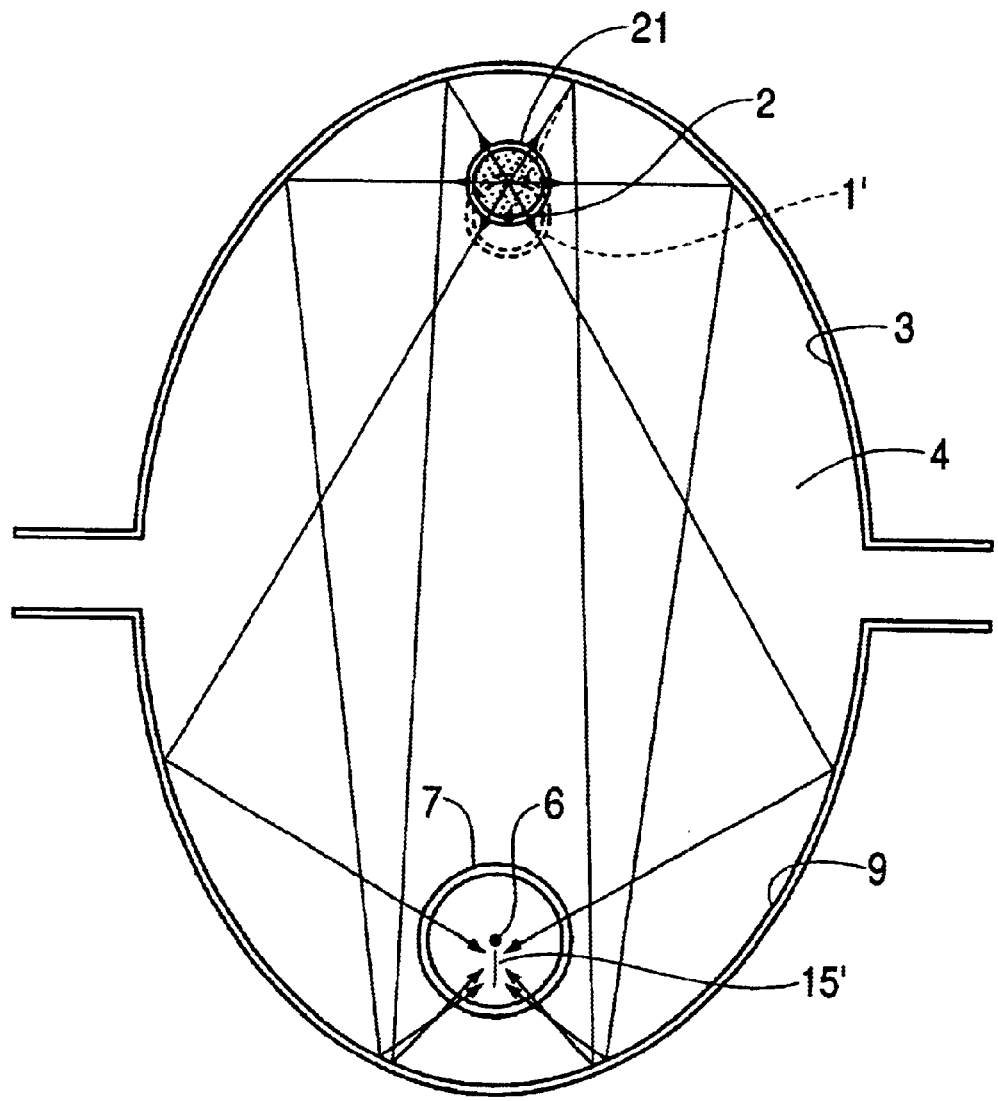
FIG. 7 is a cross-sectional view of the lamp according to a second embodiment of the present invention.

FIG. 7 shows another embodiment according to the present invention. According to this embodiment, ribbon 15' is oriented with surfaces extending substantially parallel to the major axis of elliptical space 4. As seen in FIG. 7, ribbon 15' is displaced from second focal point 6, in a direction along the major axis, towards secondary elliptical-shaped reflector 9. By displacement of the bulb according to the present invention, ribbons, for example, need not be oriented with a main surface facing the bulb, but can be oriented with main surfaces parallel to the major axis. According to the present invention, due to the dispersion of the light rays achieved, the ribbon can be positioned as in FIG. 4 or FIG. 7, or oriented at any angle therebetween (rotated to an angle from orientations shown in FIGS. 4 and 7).

Figure 8:
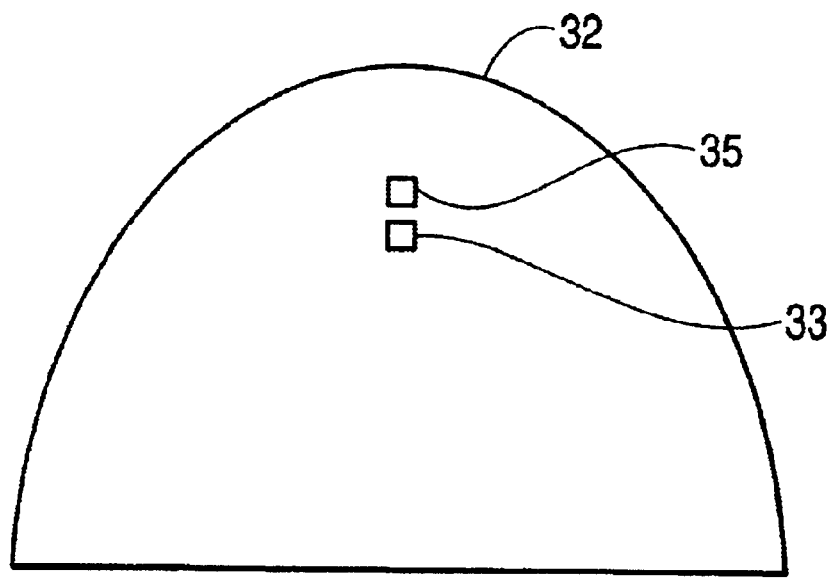
FIG. 8 shows an end reflector which can be used as part of the present invention.

As indicated previously, according to additional aspects of the present invention, opposed ends of primary elliptical-shaped reflector 3 can be covered with end reflectors. FIG. 8 shows an end reflector 32, which will be provided to cover one end of primary elliptical-shaped reflector 3. This end reflector 32, illustratively, can be the standard "209" type end reflector (Part No. 029838) of Fusion UV Systems, Inc. End reflector 32 can, for example, have a planar reflecting surface.

Also shown in end reflector 32 in FIG. 8 are two holes 33, 35 provided in end reflector 32. Hole 33 is provided at the first focal point, and hole 35 is provided displaced therefrom. According to the present invention, the bulb can be supported by hole 35, for positioning the bulb with its center displaced from first focal point 2. Thus, in being supported by hole 35, the bulb is located a little closer to the back of reflector 3, which provides a little more energy coupled to the bulb than when the bulb is at the conventional position (that is, supported by hole 33). With use of the end reflector and location of the bulb a little closer to that of the reflector, irradiance at focus is reduced, but is increased in the far field. This is an improvement to the "depth of field" (a term for the ratio of energy getting to the near surface versus a farther surface). Thus, the present structure provides non-focused energy in the near-field (surface of the fiber or ribbon closest to the bulb) and enhanced irradiation (illumination) in the far-field, to improve uniformity and improve effectiveness of the lamps. Through displacement of the bulb, especially together with the use of the end reflector, mid- to far-field irradiation and dose for three-dimension curing is improved, overcoming one of the fundamental problems in three-dimensional curing when using tubular lamps, which exhibits a serious fall-off of energy in the far-field (that is, far side of the fiber or ribbon relative to the bulb).

Figure 9:
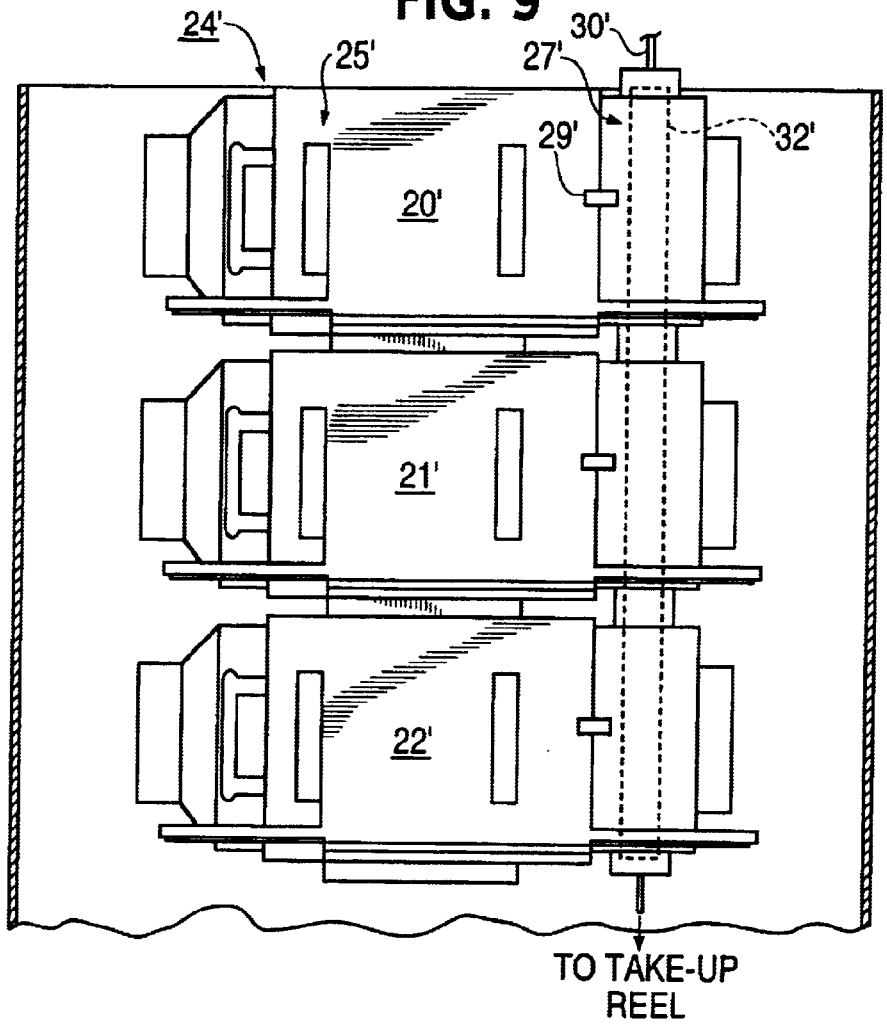
FIG. 9 is an elevational front view of an assembly of lamps for processing a continuous fiber, which can use lamps according to the present invention.
Figure 10:
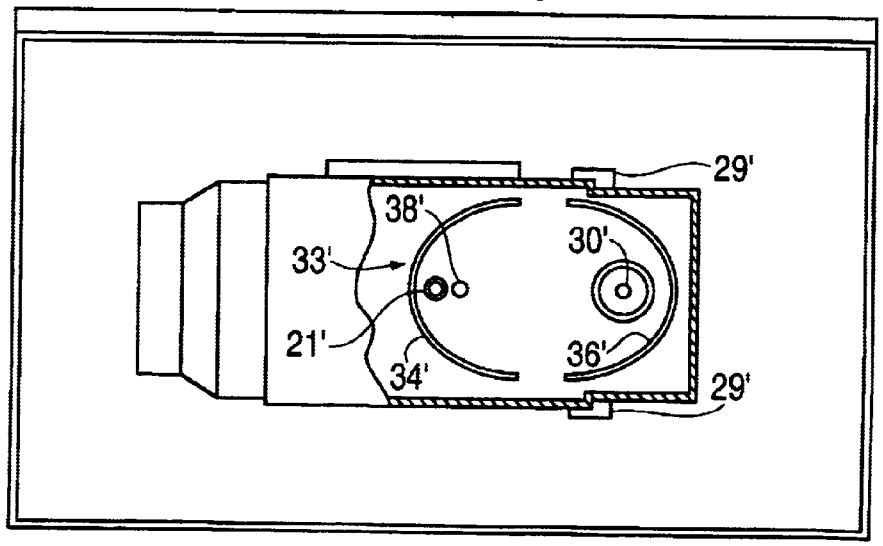
FIG. 10 is a plan view of one apparatus for treating the continuous fiber according to the present invention.

FIGS. 9 and 10 illustrate a system utilizing lamps according to the present invention for irradiating a continuous filament (fiber) or wire-like element, such as an optical fiber having a radiation curable coating, as it passes through a transparent tube (corresponding to quartz tube 7). In FIG. 9 are shown three irradiating units 20', 21' and 22'. Each could contain a lamp according to the present invention. The cabinet 24' of each of these units comprises a lamp housing 25' and a tube housing 27', which are detachably connected together by external clamping type fasteners 29', 29', one of which is on each side of the cabinet. Also shown in FIGS. 9 and 10 is a coated continuous filament 30' which is, in operation, vertically oriented and passes from a coating device down through a transparent quartz irradiating tube 32', in the vicinity of (e.g., at) the second focal point, of elliptical reflector 33'. Elliptical reflector 33' comprises a primary elliptical-shaped reflector 34' and a secondary elliptical-shaped reflector 36'. Bulb 21 is provided along the major axis of the elliptical space within elliptical reflector 33', spaced from first focal point 38'. Filament 30' is passed through the irradiating units 20', 21' and 22' and is taken up by a take-up reel (not shown in FIG. 9).

Apparatus according to the present invention can be made of materials conventionally used in forming corresponding lamp systems in the prior art, including materials for the reflectors, for the quartz tube, etc. In addition, the apparatus of the present invention can be used for applications corresponding to those in which corresponding prior art apparatus is used.

For example, the present invention can be used to treat workpieces, including continuous workpieces, such as ribbons, fibers, filaments, cables, etc. The apparatus according to the present invention provides better processing of workpieces by achieving improved uniformity of irradiation, particularly where the workpieces have thicknesses and/or widths. The present invention has a particularly advantageous use in connection with curing inks and/or coatings on, e.g., ribbons, such as ribbons of optical fibers, by irradiation of light (for example, irradiating ultraviolet light-curable coatings with ultraviolet light generated from the bulb).

Thus, the apparatus according to the present invention can be used for curing photo-responsive coatings, coloring inks and ribbon matrix polymers, to provide curing energy to meet sustained high speed demands in curing, e.g., completed fiber or ribbon when passing the fiber or ribbon continuously by the bulb (which is in the vicinity of the first focal point, but spaced therefrom) with the fiber or ribbon positioned in the vicinity of the second focal point.

Accordingly, by the present invention, both structures and methods are provided for processing workpieces, using various types of light, with the workpieces being, e.g., fibers or ribbons or cables of various widths and thicknesses. The structure can be used for any processing for such fibers, ribbons or cables, that may require a pattern of radiation flux density, and can be used in connection with processes within the fiber industry including the optical fiber energy.

While several embodiments in accordance with the present invention have been shown and described, it is understood that the same is not limited thereto, but is susceptible of numerous changes and modifications as known to those skilled in the art. Therefore, we do not wish to be limited to the details shown and described herein, but intend to cover all such changes and modifications as are encompassed by the scope of the appended claims.

What is claimed is:

1. Structure for a lamp for irradiating at least one workpiece, comprising:

a primary elliptical-shaped reflector;

a secondary elliptical-shaped reflector, the secondary elliptical-shaped reflector and the primary elliptical-shaped reflector being positioned such that a cross-section of the primary and secondary elliptical-shaped reflectors in combination form substantially an ellipse, surrounding a space, the ellipse having a major axis and first and second focal points, the first focal point being closer to the primary elliptical-shaped reflector along the major axis than is the second focal point to the primary elliptical-shaped reflector along the major axis; and support structure for a bulb of the lamp, to support the bulb within the space, positioned such that the bulb is spaced from the first focal point of the ellipse, in the vicinity thereof, on the major axis of the ellipse.

2. Structure according to claim 1, wherein the support structure supports the bulb such that the bulb is positioned spaced from the first focal point of the ellipse, on the major axis of the ellipse closer to the primary elliptical-shaped reflector, along the major axis, than the first focal point is to the primary elliptical-shaped reflector along the major axis.

3. Structure according to claim 1, wherein the primary elliptical-shaped reflector has opposed ends, and the support structure for the bulb includes end reflectors at both of the opposed ends of the primary elliptical-shaped reflector.

4. Structure according to claim 3, wherein each of the primary and secondary elliptical-shaped reflectors extends in a longitudinal direction and are positioned so as to form, in combination, substantially a cylinder, the primary and secondary elliptical-shaped reflectors being adapted to have the at least one workpiece positioned in said space, in the longitudinal direction.

5. Lamp for irradiating at least one workpiece, comprising said structure of claim 4 and a bulb, the bulb being a tubular bulb extending in said longitudinal direction and positioned on said major axis, spaced from said first focal point.

6. Structure according to claim 3, wherein the end reflectors cover entirely both ends of the primary elliptical-shaped reflector, and do not extend beyond the ends of the primary elliptical-shaped reflector.

7. Structure according to claim 1, wherein the at least one workpiece is adapted to be positioned in said space such that light, from the bulb of said lamp, reflected from the primary and secondary elliptical-shaped reflectors, irradiates all of the surfaces of the periphery of the at least one workpiece.

8. Structure according to claim 1, wherein the primary and secondary elliptical-shaped reflectors reflect ultraviolet light.

9. Structure according to claim 1, wherein each of the primary and secondary elliptical-shaped reflectors extends in a longitudinal direction and is positioned so as to form, in combination, substantially a cylinder, the primary and secondary elliptical-shaped reflectors being adapted to have the at least one workpiece positioned, in said space, in the longitudinal direction.

10. Lamp for irradiating at least one workpiece, comprising said structure of claim 9 and a bulb, the bulb being a tubular bulb extending in said longitudinal direction and positioned on said major axis, spaced from said first focal point.

11. Structure according to claim 1, wherein the primary and secondary elliptical-shaped reflectors are adapted to have the at least one workpiece positioned on said major axis, spaced from the second focal point.

12. Structure according to claim 11, wherein the primary and secondary elliptical-shaped reflectors are adapted to have the at least one workpiece positioned spaced from the second focal point, closer to the secondary elliptical-shaped reflector along the major axis, than a distance between the second focal point and the secondary elliptical-shaped reflector.

13. Structure according to claim 1, wherein the at least one workpiece is adapted to be positioned within the space during the irradiating, in the vicinity of the second focal point.

14. Structure according to claim 13, wherein the at least one workpiece is adapted to be positioned spaced from the second focal point, on the major axis.

15. Structure according to claim 13, wherein the at least one workpiece is adapted to be positioned at the second focal point, on the major axis.

16. Structure according to claim 13, wherein each of the primary and secondary elliptical-shaped reflectors extends in a longitudinal direction and is positioned so as to form, in combination, substantially a cylinder, the primary and secondary elliptical-shaped reflectors being adapted to have the at least one workpiece positioned, in said space, in the longitudinal direction.

17. Structure according to claim 16, wherein the primary elliptical-shaped reflector has opposed ends, and the support structure for the bulb includes end reflectors at both of the opposed ends of the primary elliptical-shaped reflector.

18. Lamp for irradiating at least one workpiece, comprising said structure of claim 17 and a bulb, the bulb being a tubular bulb extending in said longitudinal direction and positioned on said major axis, spaced from said first focal point.

19. Lamp for irradiating at least one workpiece, comprising said structure of claim 1, and a bulb supported by said support structure such that, in said space, said bulb is positioned on said major axis and spaced from the first focal point.

20. The lamp according to claim 19, wherein said bulb is a bulb of an electrodeless lamp, said lamp being an electrodeless lamp.

21. The lamp according to claim 20, wherein said bulb is a bulb that irradiates ultraviolet light, and said primary and secondary elliptical-shaped reflectors and end reflectors reflect ultraviolet light.

22. The lamp according to claim 21, wherein said bulb is an electrodeless bulb of a microwave-powered, ultraviolet-light generating electrodeless lamp.

23. Apparatus for irradiating surfaces of the periphery of at least one workpiece, comprising:
   a primary elliptical-shaped reflector;
   a secondary elliptical-shaped reflector, the secondary elliptical-shaped reflector and the primary elliptical-shaped reflector being positioned such that a cross-section of the primary and secondary elliptical-shaped reflectors in combination form substantially an ellipse, surrounding a space, the ellipse having a major axis and first and second focal points, the first focal point being closer to the primary elliptical-shaped reflector, along the major axis, than is the second focal point;
   a bulb positioned on the major axis, spaced from the first focal point, in the vicinity thereof; and
   structure for passing the at least one workpiece through said space surrounded by the primary and secondary elliptical-shaped reflectors.

24. Apparatus according to claim 23, wherein the primary and secondary elliptical-shaped reflectors extend in a longitudinal direction such that the primary and secondary elliptical-shaped reflectors in combination form a cylinder, wherein the structure for passing the at least one workpiece passes the at least one workpiece in the longitudinal direction, and wherein the bulb is a tubular bulb having an axis extending in the longitudinal direction.

25. Apparatus according to claim 24, wherein the structure for passing the at least one workpiece is a structure for passing at least one continuous member.

26. Apparatus according to claim 25, wherein the structure for passing the at least one workpiece is a structure for passing at least one continuous fiber, ribbon or cable.

27. Apparatus according to claim 24, wherein the structure for passing the at least one workpiece is a structure for passing at least one optical fiber.

28. Apparatus according to claim 24, wherein the bulb is positioned closer to the primary elliptical-shaped reflector, along the major axis, than the first focal point is to the primary elliptical-shaped reflector along the major axis.

29. Apparatus according to claim 24, wherein the elliptical-shaped reflector has opposed ends, and wherein the apparatus further includes end reflectors at both of the opposed ends of the primary elliptical-shaped reflector.

30. Apparatus according to claim 29, wherein the end reflectors support the bulb.

31. Apparatus according to claim 29, wherein the end reflectors cover the opposed ends of the primary elliptical-shaped reflector, but do not extend beyond the primary-elliptical shaped reflector.

32. Apparatus according to claim 23, wherein the bulb is positioned closer to the primary elliptical-shaped reflector, along the major axis, than the first focal point is to the primary elliptical-shaped reflector along the major axis.

33. Apparatus according to claim 23, wherein the structure for passing the at least one workpiece is a structure for passing the at least one workpiece through said space, in the vicinity of the second focal point.

34. Apparatus according to claim 33, wherein said structure is a structure for passing the at least one workpiece through said space in the vicinity of, and spaced from, the second focal point.

35. A method of irradiating at least one workpiece, comprising the steps of:
(a) providing lamp structure including:
a primary elliptical-shaped reflector;
a secondary elliptical-shaped reflector, the secondary elliptical-shaped reflector and the primary elliptical-shaped reflector being positioned such that a cross-section of the primary and secondary elliptical-shaped reflectors in combination form substantially an ellipse, surrounding a space, the ellipse having a major axis and first and second focal points, the first focal point being closer to the primary elliptical-shaped reflector, along the major axis, than is the second focal point; and
a bulb positioned on the major axis, in the vicinity of the first focal point and spaced therefrom;
(b) passing the at least one workpiece through the space surrounded by the primary and secondary elliptical-shaped reflectors, in the vicinity of the second focal point; and
(c) while passing the at least one workpiece, radiating light from the bulb, the light reflecting off the primary and secondary elliptical-shaped reflectors, to irradiate surfaces of the periphery of the at least one workpiece.

36. The method according to claim 35, wherein the bulb is positioned closer to the primary elliptical-shaped reflector, along the major axis, than the first focal point is to the primary elliptical-shaped reflector along the major axis.

37. The method according to claim 36, wherein the primary and secondary elliptical-shaped reflectors extend in a longitudinal direction such that the primary and secondary elliptical-shaped reflectors in combination form a cylinder;
wherein the bulb is tubular, having an axis extending in the longitudinal direction; and
wherein in passing the at least one workpiece, the at least one workpiece is passed in the longitudinal direction.

38. The method according to claim 37, wherein said at least one workpiece is selected from the group consisting of at least one ribbon, fiber and cable, and said passing continuously passes the at least one workpiece in the longitudinal direction through said space in the vicinity of said second focal point.

39. The method according to claim 38, wherein said at least one workpiece is at least one optical fiber.

40. The method according to claim 35, wherein the primary and secondary elliptical-shaped reflectors extend in a longitudinal direction such that the primary and secondary elliptical-shaped reflectors in combination form a cylinder;
wherein the bulb is tubular, having an axis extending in the longitudinal direction; and
wherein in passing the at least one workpiece, the at least one workpiece is passed in the longitudinal direction.

41. The method according to claim 40, wherein the primary elliptical-shaped reflector has opposed ends in the longitudinal direction, and wherein the lamp structure further includes end reflectors at both of the opposed ends of the primary elliptical-shaped reflector; and in radiating the light, the light also reflects off the end reflectors.

42. The method according to claim 35, wherein the primary elliptical-shaped reflector has opposed ends, and wherein the lamp structure further includes end reflectors at both of the opposed ends of the primary elliptical-shaped reflector; and
in radiating the light, the light also reflects off the end reflectors.

43. The method according to claim 42, wherein the end reflectors support the bulb.

44. The method according to claim 35, wherein the primary elliptical-shaped reflector has opposed ends, and wherein the lamp structure further includes end reflectors at the opposed ends of the primary elliptical-shaped reflector; and
in radiating the ultraviolet light, the ultraviolet light also reflects off the end reflectors.

45. A method of curing an ultraviolet light curable coating on at least one workpiece, comprising the steps of:
(a) providing lamp structure including:
a primary elliptical-shaped reflector;
a secondary elliptical-shaped reflector, the secondary elliptical-shaped reflector and the primary elliptical-shaped reflector being positioned such that a cross-section of the primary and secondary elliptical-shaped reflectors in combination form substantially an ellipse, surrounding a space, the ellipse having a major axis and first and second focal points, the first focal point being closer to the primary elliptical-shaped reflector, along the major axis, than is the second focal point; and
a bulb positioned on the major axis, in the vicinity of the first focal point and spaced therefrom; the end reflectors;
(b) passing the workpiece, having the ultraviolet light curable coating thereon, through the space surrounded by the first and second elliptical-shaped reflectors, at the first focal point;
(c) while passing the workpiece, radiating ultraviolet light from the bulb, the ultraviolet light reflecting off the primary and secondary elliptical-shaped reflectors, and the end reflectors, to irradiate surfaces of the periphery of the workpiece so as to cure the ultraviolet light curable coating.

46. The method according to claim 45, wherein the bulb is positioned closer to the primary elliptical-shaped reflector, along the major axis, than the first focal point is to the primary elliptical-shaped reflector along the major axis.

47. The method according to claim 46, wherein the primary and secondary elliptical-shaped reflectors extend in a longitudinal direction such that the primary and secondary elliptical-shaped reflectors in combination form a cylinder;
wherein the bulb is tubular, having an axis extending in the longitudinal direction; and
wherein in passing the at least one workpiece, the at least one workpiece is passed in the longitudinal direction.

48. The method according to claim 47, wherein the bulb is a microwave-powered, ultraviolet-light generating electrodeless bulb, and the step of radiating ultraviolet light from the bulb includes applying microwaves to the bulb to generate ultraviolet light.

49. The method according to claim 48, wherein said at least one workpiece is an optical fiber.

50. The method according to claim 45, wherein the primary and secondary elliptical-shaped reflectors extend in a longitudinal direction such that the primary and secondary elliptical-shaped reflectors in combination form a cylinder;

wherein the bulb is tubular, having an axis extending in the longitudinal direction; and wherein in passing the at least one workpiece, the at least one workpiece is passed in the longitudinal direction.

51. The method according to claim 50, wherein the bulb is a microwave-powered, ultraviolet-light generating electrodeless bulb, and the step of radiating ultraviolet light from the bulb includes applying microwaves to the bulb to generate the ultraviolet light.

52. The method according to claim 45, wherein the bulb is a microwave-powered, ultraviolet-light generating electrodeless bulb, and the step of radiating ultraviolet light from the bulb includes applying microwaves to the bulb to generate the ultraviolet light.

* * * * *